United States Patent [19]

Fukumitsu

[11] 4,434,480
[45] Feb. 28, 1984

[54] AUTOMATIC LOADING APPARATUS

[75] Inventor: Akira Fukumitsu, Fukaya, Japan

[73] Assignee: Tokyo Shibaura Denki Kabushiki Kaisha, Kanagawa, Japan

[21] Appl. No.: 304,886

[22] Filed: Sep. 23, 1981

[30] Foreign Application Priority Data

Oct. 2, 1980 [JP] Japan .................. 55-138138

[51] Int. Cl.³ .............................................. G11B 17/04
[52] U.S. Cl. ....................................... 369/77.2; 360/86
[58] Field of Search ..................... 369/77; 360/86, 99, 360/133

[56] References Cited

U.S. PATENT DOCUMENTS

| | | | |
|---|---|---|---|
| 3,662,360 | 5/1972 | Lambert | 369/77 |
| 3,743,400 | 7/1973 | Haring et al. | 353/27 A |
| 3,836,731 | 9/1974 | Wilisch et al. | 369/191 |
| 3,899,181 | 8/1975 | Damnert et al. | 360/133 |
| 3,907,305 | 9/1975 | Paul et al. | 360/86 |
| 3,941,391 | 3/1976 | Ohmiya et al. | 369/291 |
| 4,168,835 | 9/1979 | Omiya et al. | 369/77 |
| 4,285,524 | 8/1981 | Hughes et al. | 369/77 |

FOREIGN PATENT DOCUMENTS 2083213 4/1982 United Kingdom .................. 369/77

OTHER PUBLICATIONS

Japanese Laid Open Patent Sepc. No. 106818/1974 and Abridged Translation dated Oct. 9, 1974.

*Primary Examiner*—Steven L. Stephan
*Attorney, Agent, or Firm*—Stevens, Davis, Miller & Mosher

[57] ABSTRACT

In apparatus for loading a disc recorded with informations in a player of the type wherein a caddie containing the disc is inserted into the player along spaced parallel guide rails, a locking device is provided in the player which arrests the inserted disc, an empty caddie is withdrawn from the player leaving the arrested disc, and the informations in the inserted disc are then reproduced, there are provided a pair of spaced rollers urged against opposite side portions of the caddie, an electric motor for rotating the rollers in opposite directions for inserting or withdrawing the caddie into and out of the player, and first and second switches actuated by the caddie for driving the motor is one or opposite direction.

3 Claims, 18 Drawing Figures

AUTOMATIC LOADING APPARATUS

BACKGROUND OF THE INVENTION

This invention relates to a record reproducing device such as an audio and a video disc player, and more particularly to an automatic loading apparatus for inserting or withdrawing into and out of a video disc player a protective casing which houses a video disc (hereinafter termed a caddie).

Generally, in a record (recorded with sound and/or video information—hereinafter merely termed a disc) reproducing apparatus such as a video disc player, information recorded in the disc is reproduced with a pickup means in the form of a stylus or the like cooperating with the disc mounted on a turntable.

Video information is recorded in the video disc at an extremely high density. Should the disc be contaminated by dust or dirt from the hands, the reproduced video signals would contain noise. For this reason, many devices have been developed by which the disc can be mounted on or dismounted from the turntable without being touched.

In such a video disc player, the disc is surrounded by a holder termed a spine, and the holder is contained in a caddie. The caddie is then inserted into the player and thereafter withdrawn therefrom leaving the disc and spine in the player. After playing or reproducing, an empty caddie is reinserted into the player for accommodating again the disc and spine in the caddie and the caddie thus recharged is withdrawn from the player.

A typical construction of a prior art player, caddie, disc and spine will be briefly described with reference to FIGS. 1, 2 and 3 of the accompanying drawings.

As shown in FIG. 1, an opening 101 adapted to insert a caddie is formed through the front wall of a casing of a player 1, and various operating push buttons 102 for play, fast running, reverse running, etc., are also provided on the front wall of the player.

As shown in FIG. 2, the caddie 2 takes the form of a rectangular box to accommodate therein a spine 4 and a disc 3 through its top opening 201. The spine 4 has a rectangular closing member 401 adapted to close the opening 201 of the caddie 2 and an annular member 403 for holding the disc 3. A notch 402 is formed at the central portion of the closing member 401.

FIG. 3 shows a state in which the spine 4 and the disc 3 are contained in the caddie 2.

The internal construction of the player 1 is shown in FIG. 4. As shown, a pair of opposed U shaped guide rails 5 and 5' are provided on both sides at the same level as the opening 101 for guiding the caddie 2. When the caddie reaches the innermost position, it engages a locking device 6 including a pair of pawls 61 and 62 adapted to engage the notch 402 of the closing member 401 to lock or arrest the spine. Thereafter, as the caddie is withdrawn from the player 1, the disc 3 will remain in the player 1 while being held by the spine 4. The spine 4 and the disc 3 left in the player 1 are supported by a plurality of supports 7 having upper surfaces at a level higher than a turntable 8. The guide rails 5 and 5', the locking device 6 and the supports 7 are mounted on a chassis 9.

The operation of the turntable 8 with reference to the insertion and removal of the caddie 2 will now be described with reference to FIGS. 5a, 5b, 5c and 5d.

When a caddie 2 containing a spine 4 and disc 3 is inserted into the player 1 through opening 101, the caddie 2 is moved to the innermost portion of the player 1 along guide rails 5 and 5'. At this time, the caddie 2 is moved on the upper surfaces of the supports 7 as shown in FIG. 5b. The upper surface of the turntable 8 is located beneath the supports 7. As the caddie 2 is inserted further, it collides against the locking device 6 so that the pawls 61 and 62 engage the notch 402 to lock or arrest the spine 4 as shown in FIG. 5a. As the caddie 2 is withdrawn from the player 1, only the spine 4 and the disc 3 would be left on the supports 7. When one of the push buttons 102 of the player 1 is depressed after the caddie 2 has been withdrawn, the turntable 8 is raised as shown in FIG. 5d. As the turntable 8 is raised to a level higher than the supports 7, only the disc 3 would be mounted on the turntable 8. An arm carrying a pick-up means such as a stylus is brought into an operative position to reproduce information recorded on the disc.

When the reproduction is completed, the arm is returned to the original position, the rotation of the turntable 8 is also stopped and it is lowered to the position shown in FIG. 5c. Then, an empty caddie 2 is inserted into the player 1 to cause the locking device 6 to release the spine 4. Consequently, it is possible to withdraw the caddie 2 containing the spine 4 and the disc 3 out of the player 1 as shown in FIG. 5b.

The turntable 8 can be moved in the vertical direction as shown in FIG. 5d by any suitable mechanism, for example, the one disclosed in Japanese utility model application No. 97840/80 dated July 11, 1980 filed by the same applicant.

One example of the construction of the locking device 6 is disclosed in, for example, Japanese patent application No. 74999/77, dated June 24, 1977 (laid open patent specification No. 99023/79) filed by the same applicant. In addition to a specific locking device shown in the drawings, various other locking devices have been developed, so that any one of them may be used.

In the prior art video disc player 1 of the type described, since the caddie 2 is manually inserted and withdrawn into and out of the player 1, the manner of insertion and withdrawal of the caddie varies each time. More particularly a too weak insertion causes imperfect locking, whereas a too strong withdrawal causes damage of the locking device.

SUMMARY OF THE INVENTION

Accordingly, it is a principal object of this invention to provide an improved automatic loading apparatus capable of automatically inserting and withdrawing a caddie, thus safely and accurately loading a disc in a player.

According to this invention, there is provided apparatus for loading a disc recorded with information in a player of the type wherein a caddie containing the disc is inserted into the player along guide means, locking means is provided in the player which arrests the inserted disc, an empty caddie is withdrawn from the player leaving the arrested disc, within the player and the information on the arrested disc is then reproduced, characterized in that there are provided a pair of spaced rollers urged against opposite side portions of the caddie, an electric motor for rotating the rollers in opposite directions for inserting or withdrawing the caddie into and out of the player, and switch means for controlling the direction of rotation of the electric motor in accordance with movement of the caddie.

DESCRIPTION OF THE PREFERRED EMBODIMENTS

Figure 6:
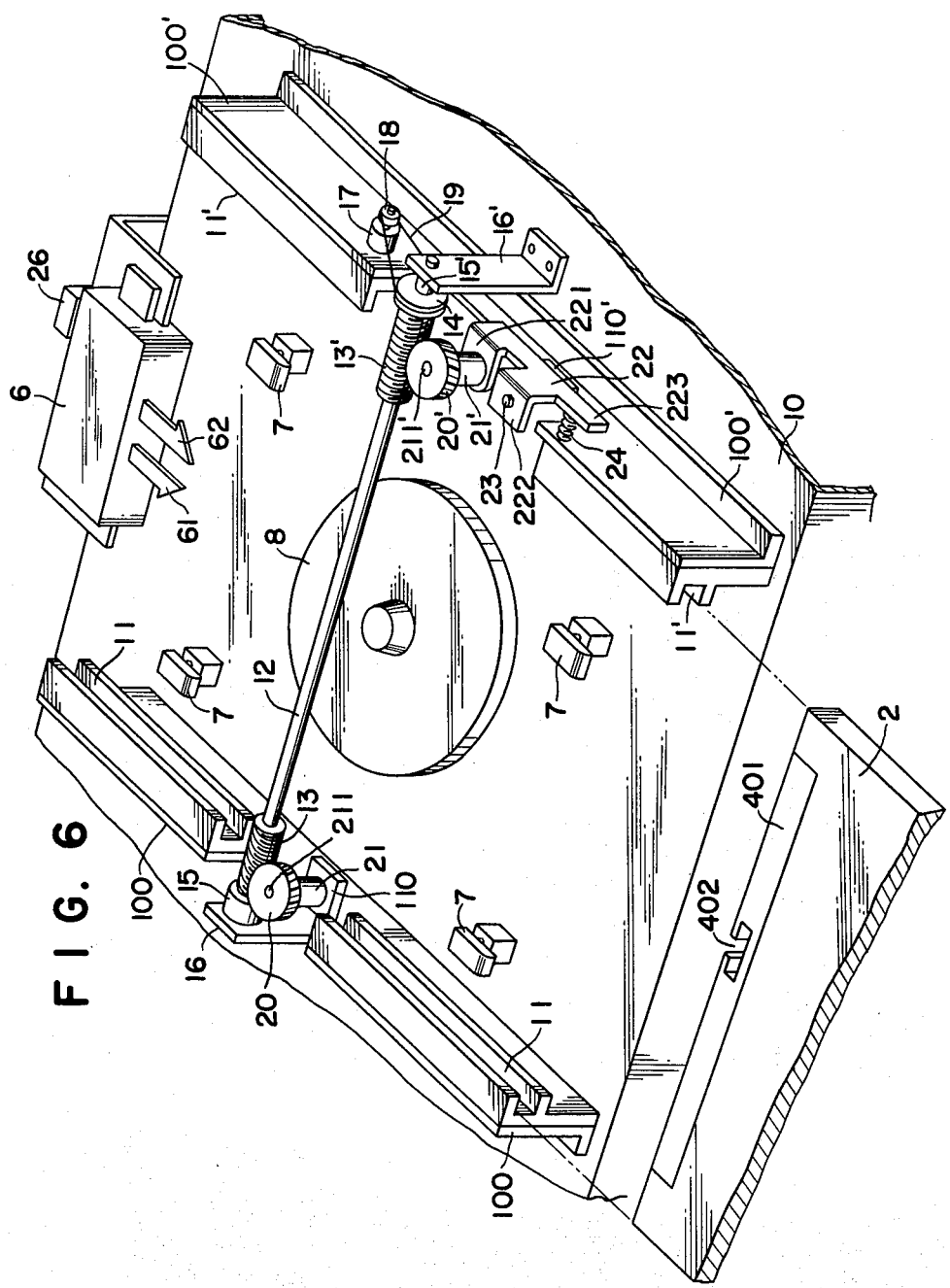
FIG. 6 is a perspective view showing one embodiment of the automatic loading apparatus according to this invention.

A preferred embodiment of this invention will be described with reference to FIGS. 6, 7 and 8. As shown in FIG. 6, a pair of spaced parallel guide rails 11 and 11' are mounted on a chassis 10 on the same level as the caddie insertion opening 101, the guide rails 11 and 11' being supported by upright subchassises 100 and 100'. Intermediate portions of the guide rails 11 and 11' are cut away, and a transverse loading shaft 12 is received in the notches thus formed with worms 13 and 13' formed on both sides. One worm 13' is integrally formed with a pulley 14 at one end thereof. The opposite ends of the loading shaft 12 are rotatably supported by brackets 16 and 16' through bearings 15 and 15', the lower ends of these brackets being secured to the upper surface of the chassis 10. A driving motor 17 is secured to the subchassis 100' at a point near the worm 13' and a belt 19 is passed about the pulley 14 and a pulley 18 driven by the motor 17 so as to rotate the loading shaft 12 through worm 13'. There are provided worm wheels 20 and 20' respectively meshing with the worms 13 and 13' and rollers 21 and 21' which are made of material having a large coefficient of friction such as rubber are secured to the lower surfaces of the worm wheels 20 and 20' to rotate about pins 211 and 211', one pin 211 being journalled by a bent portion 110 of the subchassis 100 while the other pin 211' being supported by a bent portion 221 at one end of a lever 22 which is rotatable about a pin 23 at the central portion. The pin 23 is supported by a bent portion 110' of the subchassis 100'. A compression spring 24 is interposed between the other end 223 of the lever 22 and the subchassis 100' to urge inwardly the opposite end 221 of the lever 22.

Figure 1:
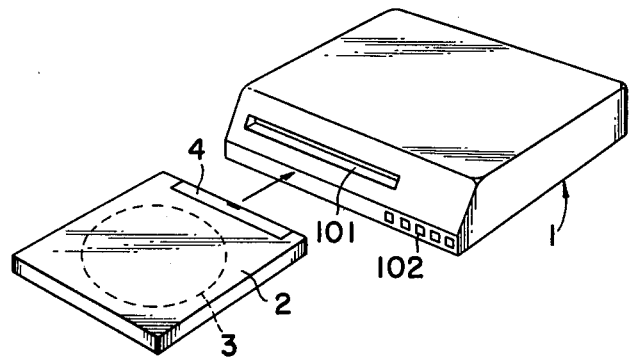
FIG. 1 is a perspective view showing a typical prior art video disc player.
Figure 2:
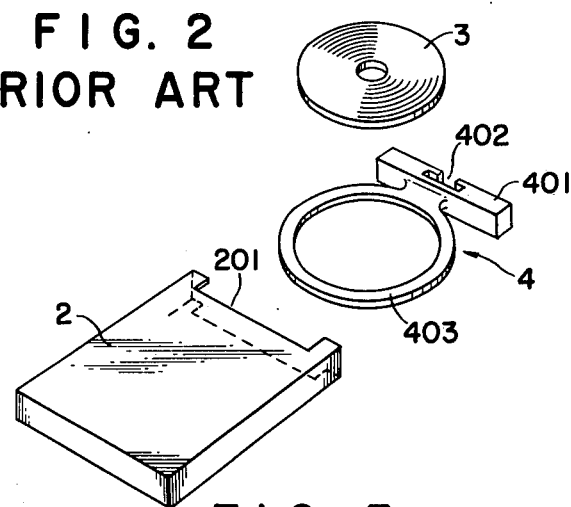
FIG. 2 is an exploded view showing a caddie, a spine and a disc.
Figure 3:
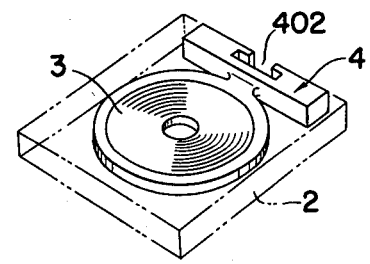
FIG. 3 is a perspective view showing a state in which the spine and the disc are contained in the caddie.
Figure 4:
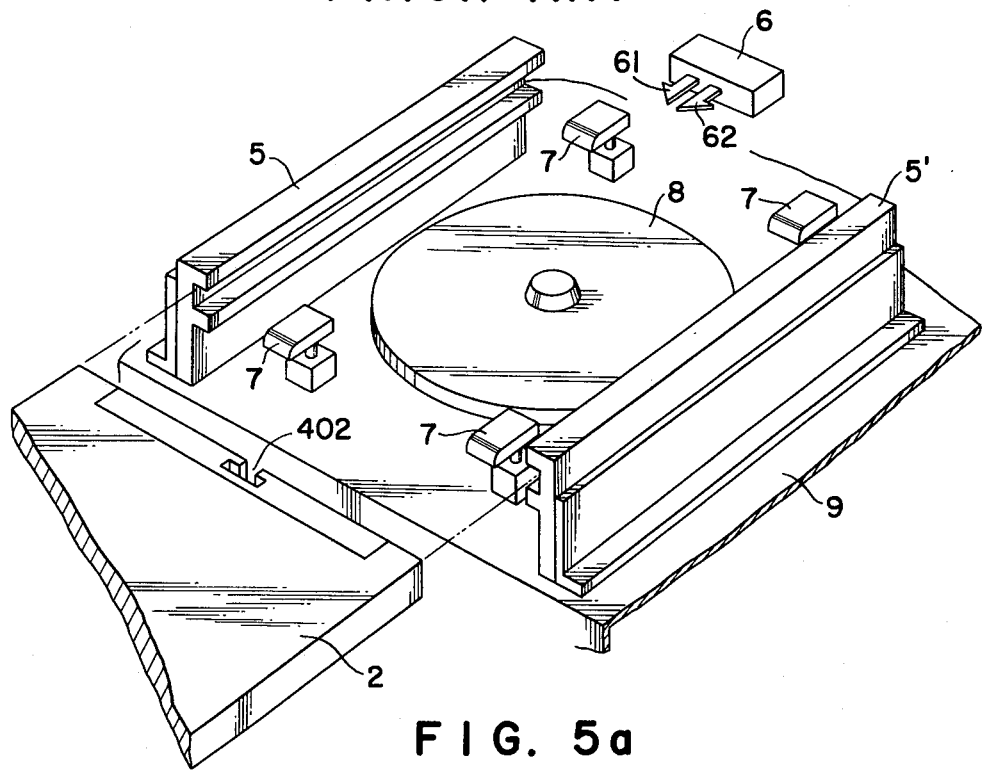
FIG. 4 is a perspective view showing the internal construction of the player.

In the same manner as in FIG. 4, a locking device 6, supports 7 and a turntable 8 are mounted on the chassis 10.

Figure 7:
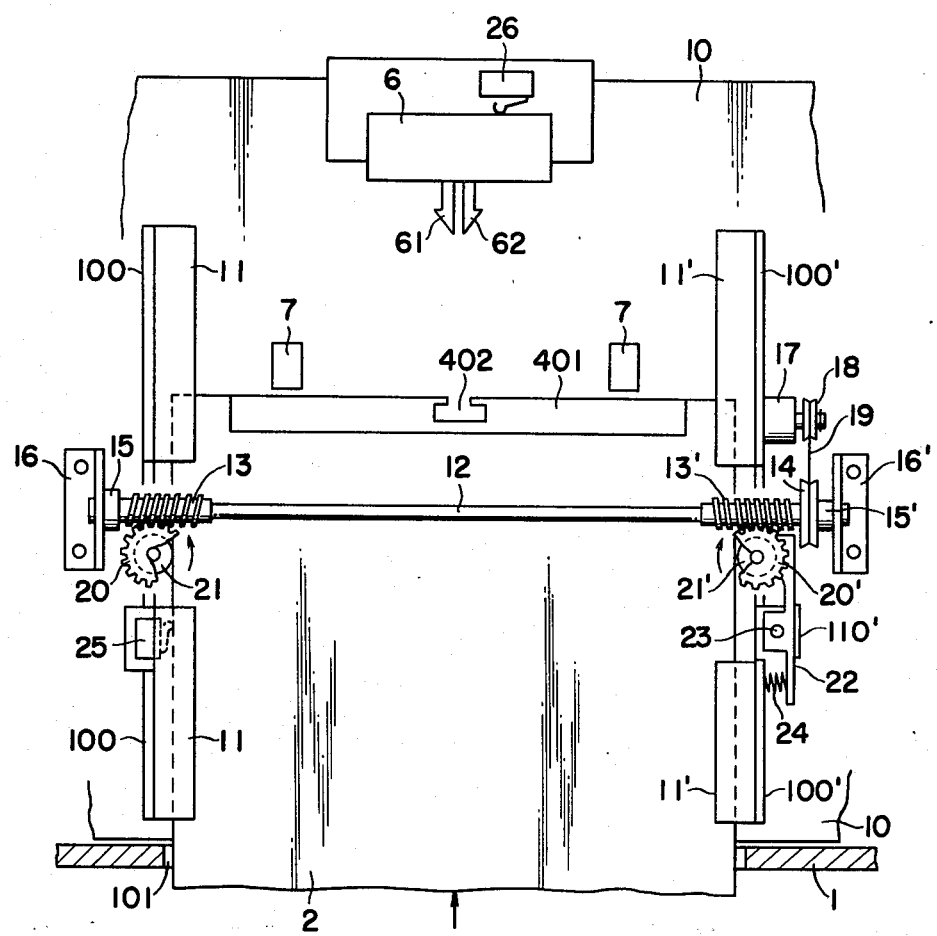
FIG. 7 is a plan view of the automatic loading apparatus shown in FIG. 6 useful in explaining the operation thereof.

As shown in FIG. 7, a switch 25 for rotating the motor 17 in the forward direction is mounted on the guide rail 11 in front of the roller 21, while a switch 26 for rotating the motor 17 in the reverse direction is mounted on the rear side of the locking device 6. The screw threads of the worms 13 and 13' are cut in the opposite directions so that worm wheels 20 and 20' rotate in the opposite directions to enable advance and return of the caddie.

Figure 8:
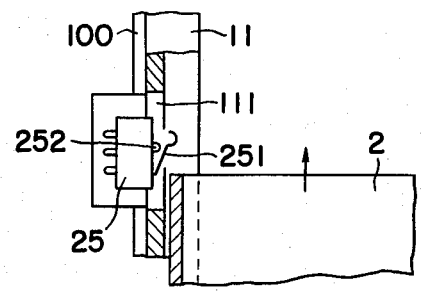
FIG. 8 is a partial plan view, partly in section, showing the position of mounting a forward rotation switch.

FIG. 8 shows a position of mounting the switch 25 for forwardly rotating the motor 17. Thus, a window 111 is formed at a portion of the guide rail 11 and the movable contact 251 of the switch 25 is projected through the window 111 into the path of the caddie. Consequently, as the caddie 2 is inserted in a direction shown by an arrow, the movable contact 251 is caused to engage a stationary contact 252 to rotate the motor 17 in the forward direction. The forward direction means that the worm gear 20' rotates in the clockwise direction and the worm gear 20 rotates in the counterclockwise direction so as to insert the caddie, whereas opposite or reverse direction means reverse rotation of these members.

The reverse rotation switch 26 is arranged such that its movable contact is held open until the caddie 2 engages the locking device 6 but the contact is closed when the locking device 6 is pressed by the inserted caddie thereby reversing the motor 17.

Switches 25 and 26 are connected to the motor 17 through a suitable electric circuit to cause it to rotate in the forward or reverse direction in a manner to be described later.

In operation, when the caddie 2 is inserted into the player 1 through the opening 101, the caddie 2 is moved into the deep portion of the player 1 with its opposite sides guided by guide rails 11 and 11'. Then, the forward rotation switch 25 would be closed as has already been described in connection with FIG. 8, whereby the motor 17 rotates in the forward direction. Accordingly, the loading shaft 12 and worms 13 and 13' are rotated through belt 19 so as to rotate the worm gear 20 in the counterclockwise direction and the worm gear 20' in the clockwise direction as shown in FIG. 7. At this time, rollers 21 and 21' are rotated together with the worm gears 20 and 20' to drive the caddie 2 into the player 1. Since the rollers 21 and 21' are made of a material having a large coefficient of friction, and since roller 21' is urged against one side of the caddie 2 by the spring 24, once the caddie is inserted between rollers 21 and 21' it is automatically advanced by the motor 17.

Figure 5A:
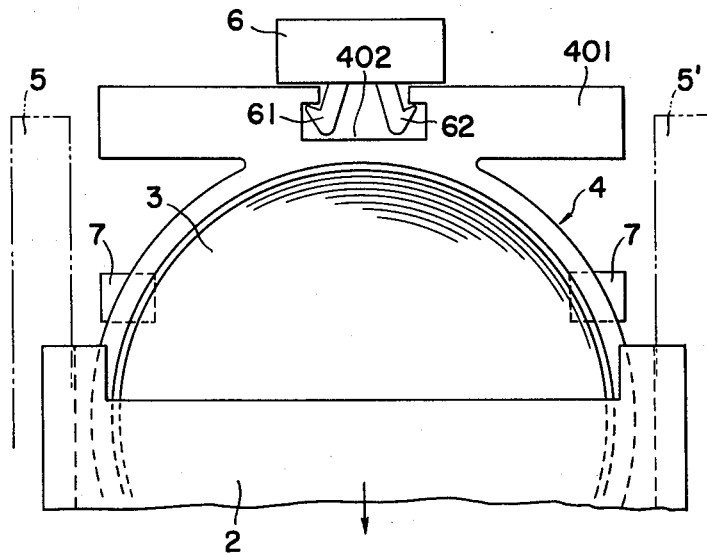
FIGS. 5a through 5d are a plan view and side views for explaining the operation of a video disc player.
Figure 5B:
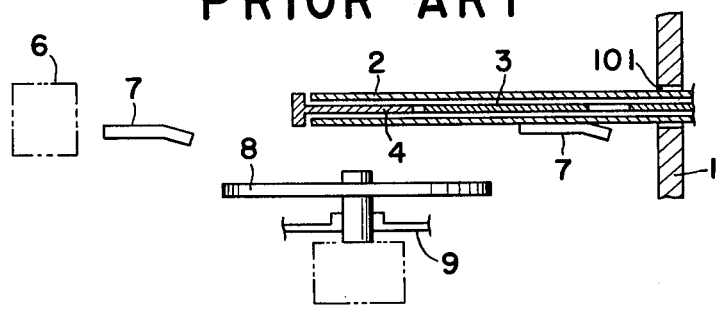
Figure 5C:
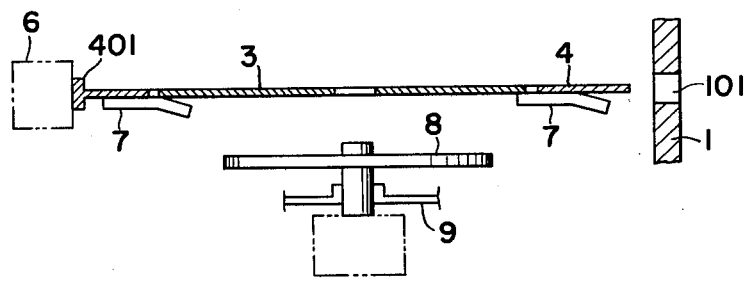

As the caddie 2 collides against the locking device 6, the spine 4 is locked as shown in FIG. 5a. When the locking device 6 is pressed by the caddie 2, it closes the reverse rotation switch 26 to rotate the motor 17 in the reverse direction, whereby the loading shaft 12, worm gears 20 and 20', and rollers 21 and 21' are rotated in the reverse direction to draw out the caddie 2. When the upper end of the caddie 2 passes by the rollers 21 and 21', the retraction motion of the caddie is stopped by the deenergization of the motor 17 due to opening of the switch 25. Then, the caddie can be removed by hand.

Figure 5D:
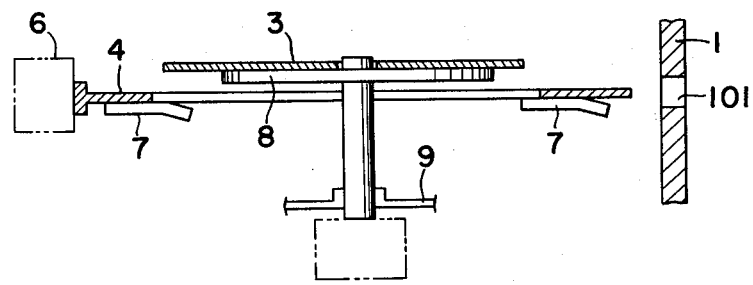

As above described, the caddie can be automatically inserted and withdrawn and locked spine 4 and the disc 3 held thereby are left in the player 1, so that the disc 3 can be reproduced when the turntable 8 is raised as shown in FIG. 5d.

Upon completion of the reproduction, an empty caddie 2 is inserted into the automatic loading apparatus until it engages locking device 6 to cause it to release previously locked spine 4 and the disc 3. The released spine and disc 3 are received in the caddie 2 and then drawn out.

The mechanism for automatically inserting and withdrawing the caddie 2 in a manner described above can also be constructed as shown in FIG. 9 in which rollers 31, 35, 31' and 35' are pressed against the upper and lower surfaces of both sides of the caddie 2 for inserting and withdrawing the same. In this modification, the rollers 31 and 31' are coaxially secured to the opposite ends of the loading shaft 12 and one end 121 of the shaft 12 adjacent to the roller 31' is projected through the subchassis 100' to support a worm gear 32 meshing with a worm 33 driven by motor 17 through a belt 19 and pulleys 18 and 34. Rollers 35 and 35' are rotatably mounted on subchassises 100 and 100' to respectively oppose rollers 31 and 31' with predetermined spacings therebetween. The motor 17 and the worm 33 are supported by a bent portion 200 of the subchassis 100'.

Figure 9:
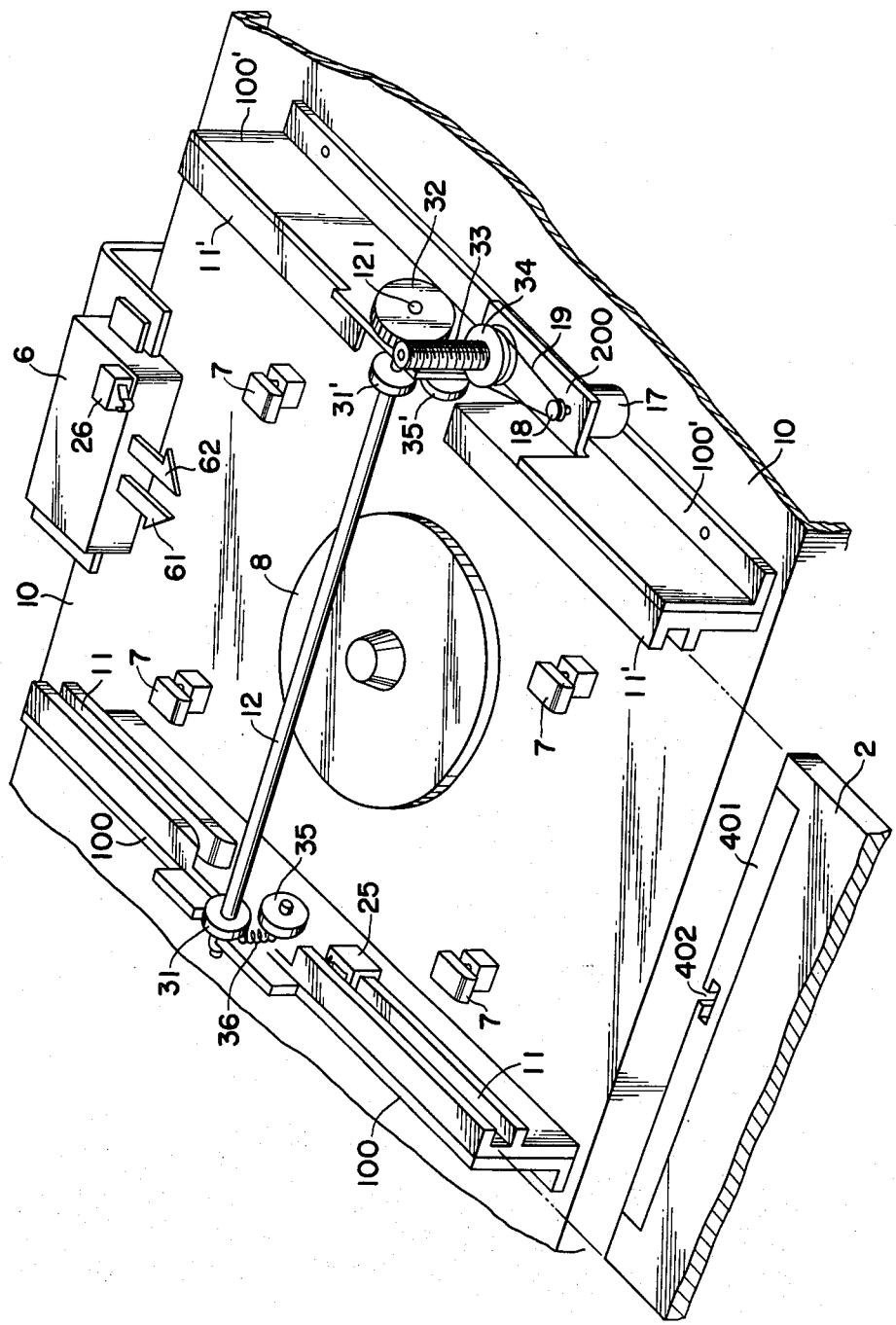
FIG. 9 is a perspective view showing another embodiment of the automatic loading apparatus according to this invention.

Although the forward rotation switch 25 may be mounted in a manner as shown in FIG. 8, in the modification shown in FIG. 9, it is mounted on the lower surface of the guide rail 11. In any case, the switch 25 should be located in front of rollers 31 and 35. Furthermore, in this modification, the reverse rotation switch 26 is mounted on the locking device 6 to be actuated by the spine 4. Rollers 31 and 35, and rollers 31' and 35' may be biased toward each other by means of, for example, a spring 36 which pulls down the loading shaft 12. It is advantageous to construct rollers 31, 31', 35 and 35' with a material having a large coefficient of friction, for example, rubber.

The automatic loading apparatus shown in FIG. 9 operates as follows. Insertion of the caddie 2 closes the switch 25 to rotate motor 17 that drives the worm 33 through belt 19, which in turn rotates loading shaft 12 and rollers 31 and 31' via the worm gear 32. The caddie 2 is inserted between rollers 31 and 35 and between rollers 31' and 35' to be advanced by the rotation of rollers 31 and 31'. When the caddie 2 engages with the locking device 6, the reverse operation switch 26 is closed to rotate the motor 17 in the reverse direction thereby withdrawing the caddie 2.

As above described, the insertion and withdrawal of the caddie 2 are automatically effected by reversible motor 17 and the transfer speed of the caddie 2 is maintained always at a constant value so that the caddie 2 collides against the locking device 6 always with a constant force, which not only assures correct locking operation but also prevents damage of the locking device 6 due to excessive force. Since the caddie 2 is loaded automatically, the operation of the player 1 is simplified thus increasing commercial merit.

Figure 10:
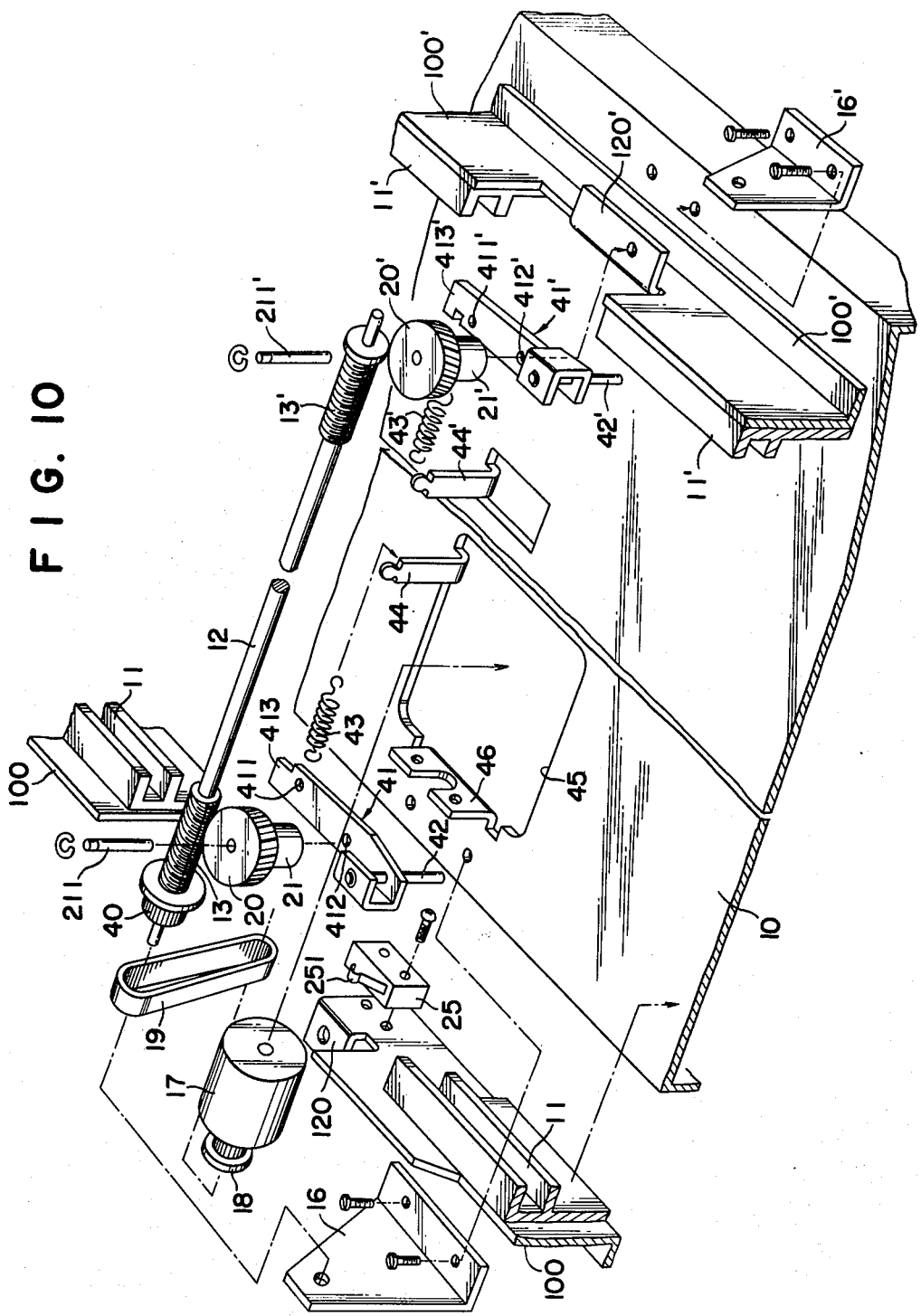
FIG. 10 is an exploded perspective view showing a modification of the automatic loading apparatus shown in FIG. 6.
Figure 11:
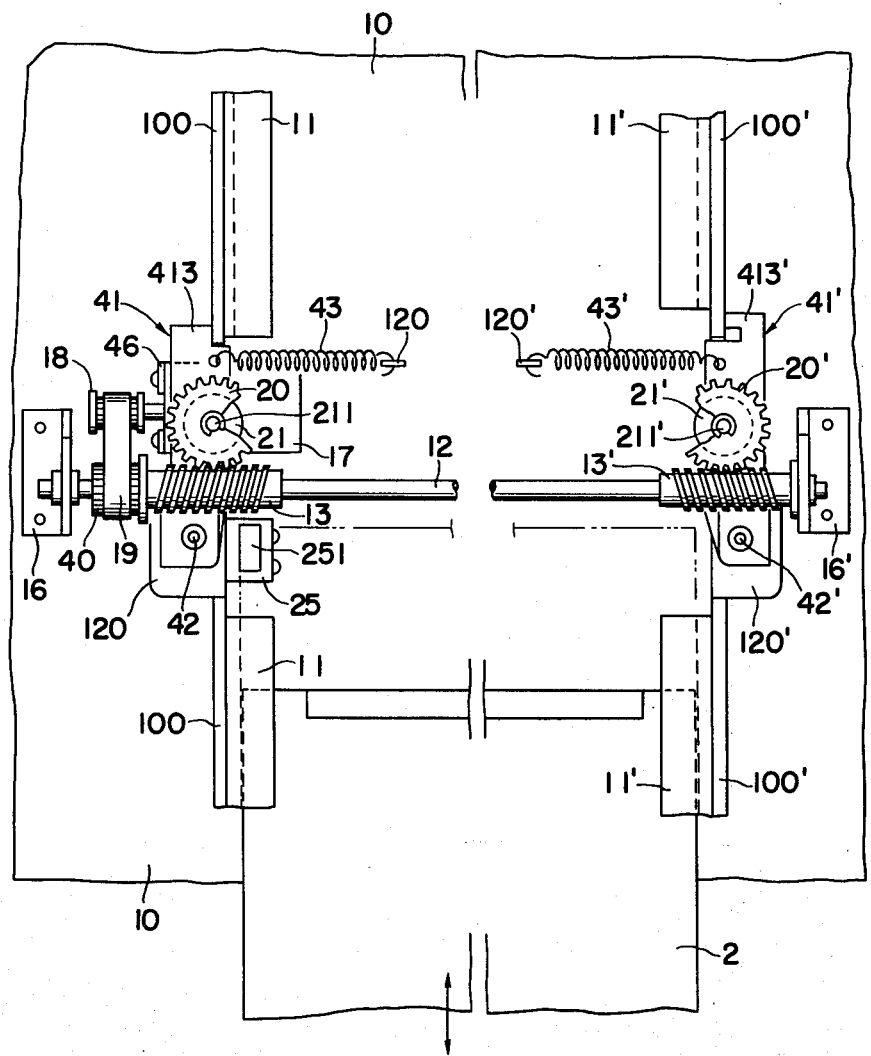
FIG. 11 is a plan view showing an assembled state of the component parts shown in FIG. 10.

FIGS. 10 and 11 show still another embodiment of this invention which is different from that shown in FIGS. 6, 7 and 8 in that the positions of mounting the worm gears 20, 20', the motor 17 and the forward rotation switch 25 are different. Moreover, a pair of members 41 and 41' are provided corresponding to lever 22.

In FIG. 10, worms 13 and 13' are formed on the opposite ends of the loading shaft 12 and a pulley 40 adapted to be engaged by a belt 19 is mounted on the shaft 12 on the outer side of the worm 13. Worm gears 20 and 20' respectively integral with rollers 21 and 21' are provided to mesh with the worms 13 and 13'. As shown in FIG. 11, the worm gears 20 and 20' are located on the rear side of the worms 13 and 13' that is on the side of the locking device, not shown. Pins 211 and 211' at the centers of rotations of the rollers 21 and 21' are supported by openings 412 and 412' of levers 41 and 41', one ends thereof being supported by pins 42 and 42' rotatably supported by bent portions 120 and 120' (see FIG. 11) of the subchassises 100 and 100'. Openings 411 and 411' are formed on the other ends of the levers 41 and 41' to anchor one ends of springs 43 and 43', the other ends of these springs being connected to bent up portions 44 and 44' of the chassis 10. Thus, the levers 41 and 41' are biased by springs 43 and 43' to move toward inside of the subchassises 100 and 100' and the rotations of these levers are stopped when their other ends 413 and 413' engage against subchassises 100 and 100', respectively. Accordingly, portions of the rollers 21 and 21' are brought into the path of movement of the caddie 2. The forward rotation switch 25 is mounted on a position similar to that shown in FIG. 9. The motor 17 is located in an opening 45 formed through the chassis 10 and supported by bent up pieces 46 such that the pulley 18 of motor 17 will be positioned on the outer side of the subchassis 100 to carry the belt 19. As shown in FIG. 11, the opposite ends of the loading shaft 12 are rotatably supported by brackets 16 and 16'.

The component elements shown in FIG. 10 are assembled as shown in FIG. 11.

The modification shown in FIGS. 10 and 11 operates in the same manner as the embodiment shown in FIG. 6 except that both rollers 21 and 21' are biased to partially enter into the path of the caddie 2 by springs 43 and 43'. With this construction, the caddie 2 can be inserted along the guide rails 11 and 11' while the same pressure is applied to both side surfaces of the caddie, with the result that the caddie 2 can be inserted without inclining.

Figure 12:
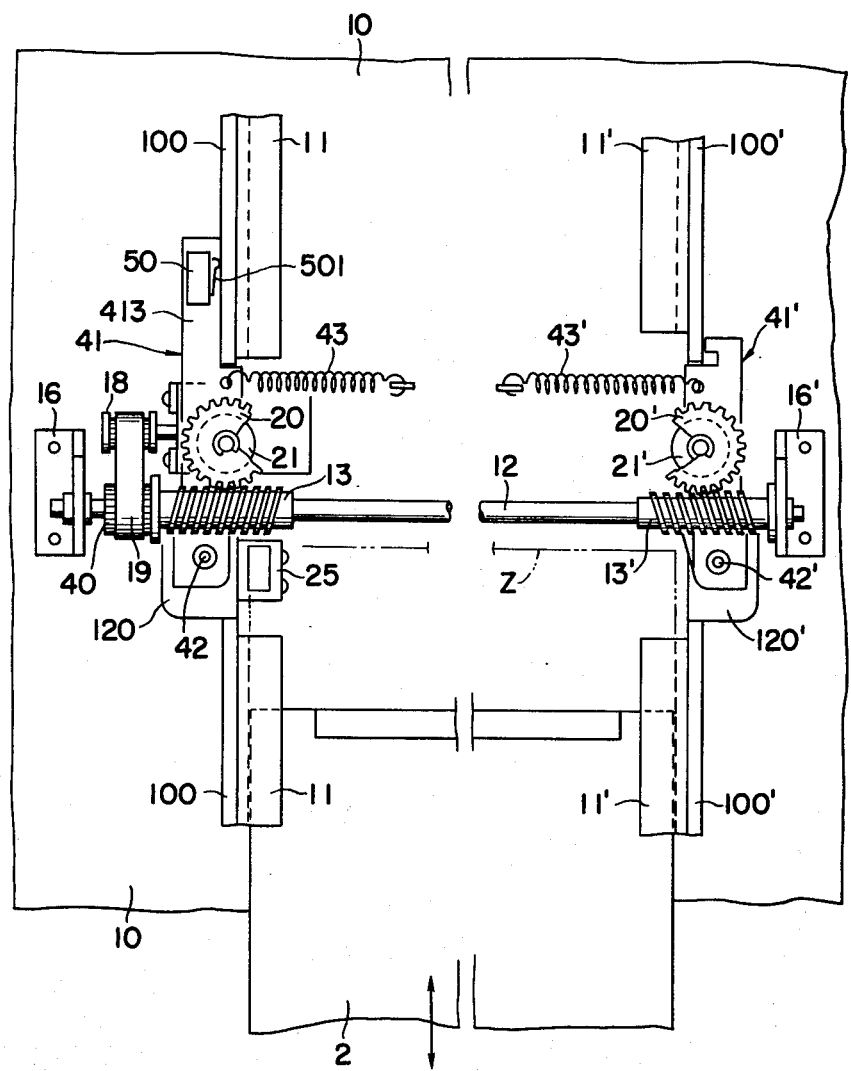
FIG. 12 is a plan view showing a modification of the embodiment shown in FIGS. 10 and 11.

FIG. 12 shows a modification of the embodiment shown in FIGS. 10 and 11 in which one end 413 of the lever 41 is elongated to support a third switch 50 that stops the rotation of the motor 17. This third switch 50 is provided for the following reason. Usually, the movable contact 501 of this switch 50 is urged against the subchassis 100 as shown in FIG. 12 because the lever 41 is pulled by the spring 43. Under this state, when the caddie 2 is inserted, the forward rotation switch 25 is closed to drive the motor 17 in the forward direction to automatically insert the caddie 2 through rollers 21 and 21'. When the spine 4 is locked by the locking device 6, the forward rotation switch 25 is disabled while the reverse rotation switch 26 shown in FIG. 7 is closed to reverse the rotation of the motor 17 to draw out the empty caddie 2 through rollers 21 and 21'. When the caddie 2 has been drawn out to a position shown by dot and dash lines Z in FIG. 12, the caddie 2 disengages the rollers 21 and 21'. Thereafter, the caddie is pulled out by hand. Then, the reverse rotation switch 26 is opened to stop motor 17 as will be described later. However, when the drawn out caddie is continuously held at the position of line Z, the reverse rotation switch 26 would not be opened, thus continuously rotating the motor. Usually, the empty caddie 2 is withdrawn by hand, so that should it be inadvertently left in the position of line Z, the motor 17 would be continuously rotated, thus not only consuming excessive power, but also resulting in overheating.

Figure 13:
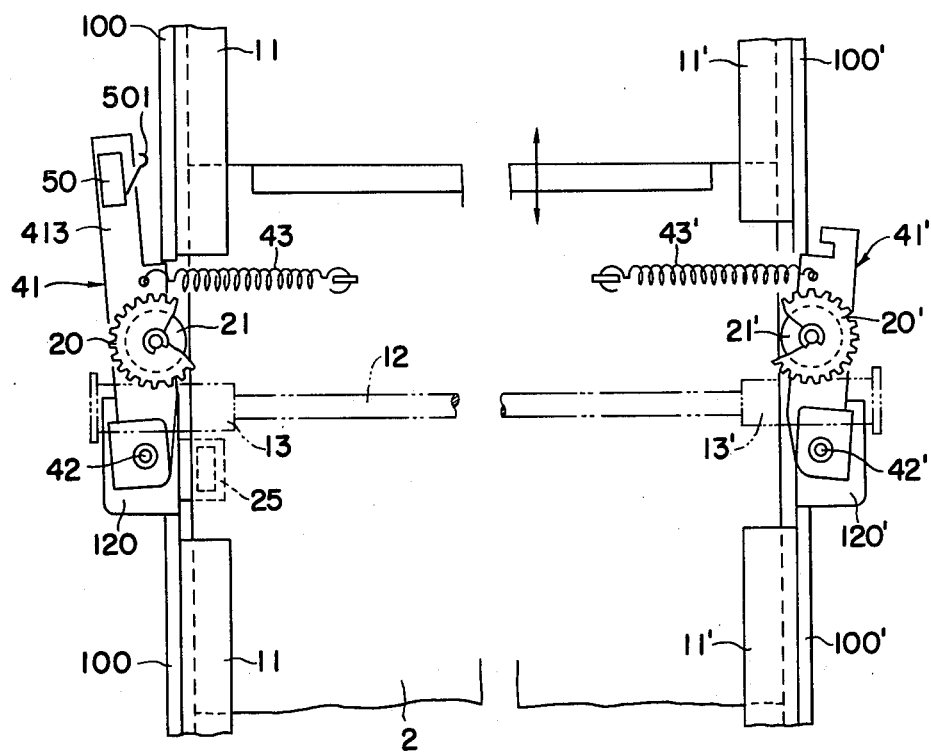
FIG. 13 is a partial plan view useful to explain the modified embodiment shown in FIG. 12.
Figure 14:
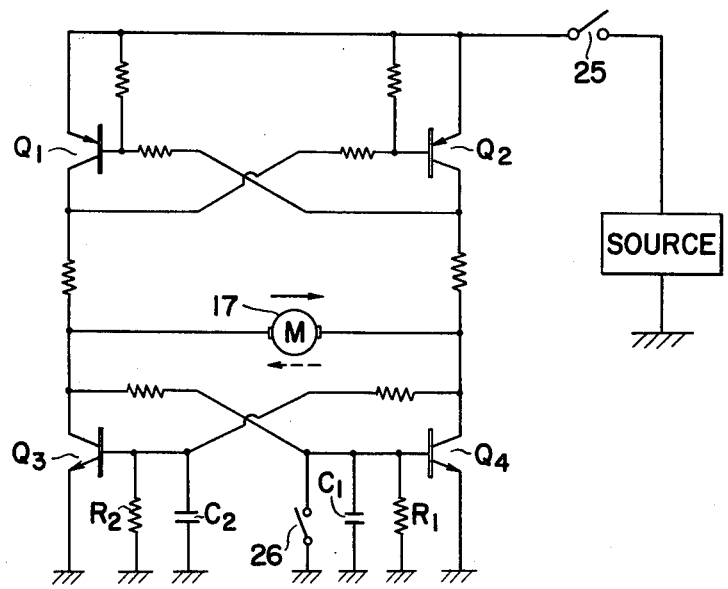
FIGS. 14 and 15 show control circuits utilized in the embodiments shown in FIGS. 6 and 7 and FIGS. 12 and 13, respectively.

The third switch 50 is provided to eliminate these problems. More particularly, as shown in FIG. 13, when the caddie is inserted rollers 21 and 21' are pushed outwardly so that lever 41 is rotated about pin 42 in the counterclockwise direction to open the switch 50. Conversely, when the caddie 2 is withdrawn, the switch 50 is closed again. FIG. 14 is a connection diagram showing an actual connection of switches 25, 26 and motor 17 shown in FIGS. 6 and 7. The motor 17 is connected across junctions between transistors $Q_1$ and $Q_3$, and between transistors $Q_2$ and $Q_4$, and time constant circuits $C_1$, $R_1$ and $C_2$, $R_2$ are associated with the base electrodes of transistors $Q_4$ and $Q_3$, respectively. Thus, when the forward rotation switch 25 is closed as a result of insertion of the caddie 2, transistors $Q_1$ and $Q_4$ are firstly turned on to pass current through the motor 17 in a solid line direction to rotate the motor 17 in the forward direction. When the reverse direction switch 26 is closed, transistors $Q_1$ and $Q_4$ are turned off while transistors $Q_2$ and $Q_3$ are turned on to pass current in the opposite direction indicated by a dotted line arrow to reverse the motor 17. To preferentially turn on transistors $Q_1$ and $Q_2$, time constants of the time constant circuits $C_1$, $R_1$ and $C_2$, $R_2$ are suitably selected so that the base potentials of transistors $Q_1$ and $Q_4$ would build up faster than those of transistors $Q_2$ and $Q_3$. When the switch 26 is closed, capacitor $C_1$ discharges through the switch 26, thus turning off transistors $Q_1$ and $Q_4$. When the caddie 2 is completely drawn out, switch 25 is opened to stop the motor 17.

Figure 15:
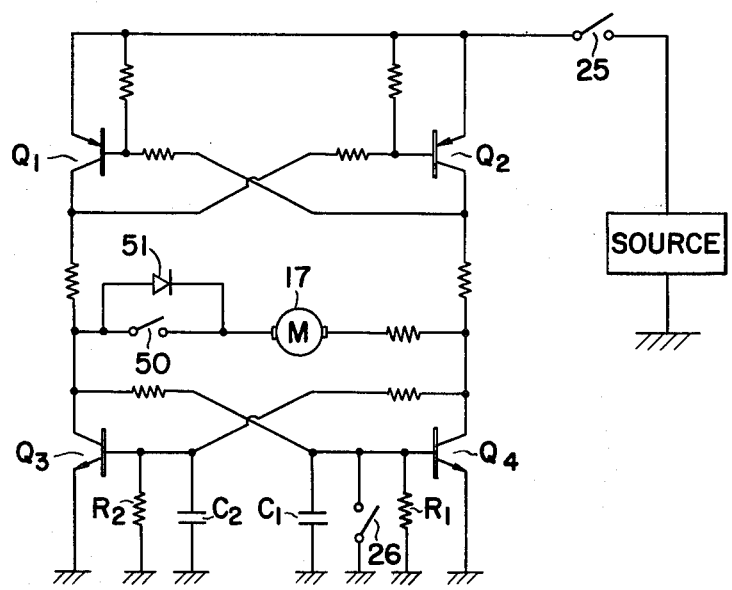

FIG. 15 is a connection diagram showing the connection of the switches 25, 26 and 50 shown in FIGS. 12 and 13. This circuit is generally similar to the circuit shown in FIG. 14 except that the switch 50 shunted by a diode 51 is connected in series with the motor 17. During the forward rotation, the diode 51 passes current to the motor 17 even when the switch 50 is opened, but during the reverse rotation, the diode 51 blocks current after opening of the switch 50.

It should be understood that the invention is not limited to the specific embodiments illustrated above. For example, means for driving the rollers 21 and 21', means for urging these rollers against the opposite side portions of the caddie, and means for mounting the switches 25, 26 and 50 can be modified without departing the true spirit and scope of invention as defined in the appended claims.

I claim:

1. In an apparatus for loading a disc recorded with information in a player of the type wherein a caddie containing said disc is inserted into the player along guide means, locking means is provided in said player for arresting the inserted disc, an empty caddie is withdrawn from said player leaving the arrested disc, and the information recorded on an arrested disc is then reproduced, the improvement comprising an electric motor, means connected to said motor for moving said caddie within said player, a first switch disposed to be actuated by said caddie when the same is mounted on said guide means, said first switch causing rotation of an electric motor in a direction which causes said moving means to insert said caddie into said player, a second switch mounted on said locking means to be actuated by said caddie when the same engages said locking means, said second switch causing rotation of said motor in a reverse direction which causes said moving means to withdraw said caddie from said player, and a third switch which is operated when said caddie is withdrawn from said player a predetermined distance for stopping said motor.

2. The apparatus according to claim 1 wherein said third switch is mounted on a pivoted lever which is engaged by said caddie for actuating said third switch.

3. The apparatus according to claim 1 wherein said caddie comprises a hollow box, and said disc is supported by a spine adapted to be received in said box, said spine being provided with a closure means arrested by said locking member.

* * * * *